Aug. 16, 1932.  T. BROWN  1,872,237
TRACTOR CULTIVATOR
Filed Aug. 29, 1927   2 Sheets-Sheet 1

WITNESS
W. Ackerman

INVENTOR
Theophilus Brown
BY John L. Jackson
ATTORNEY

Aug. 16, 1932.  T. BROWN  1,872,237
TRACTOR CULTIVATOR
Filed Aug. 29, 1927  2 Sheets-Sheet 2
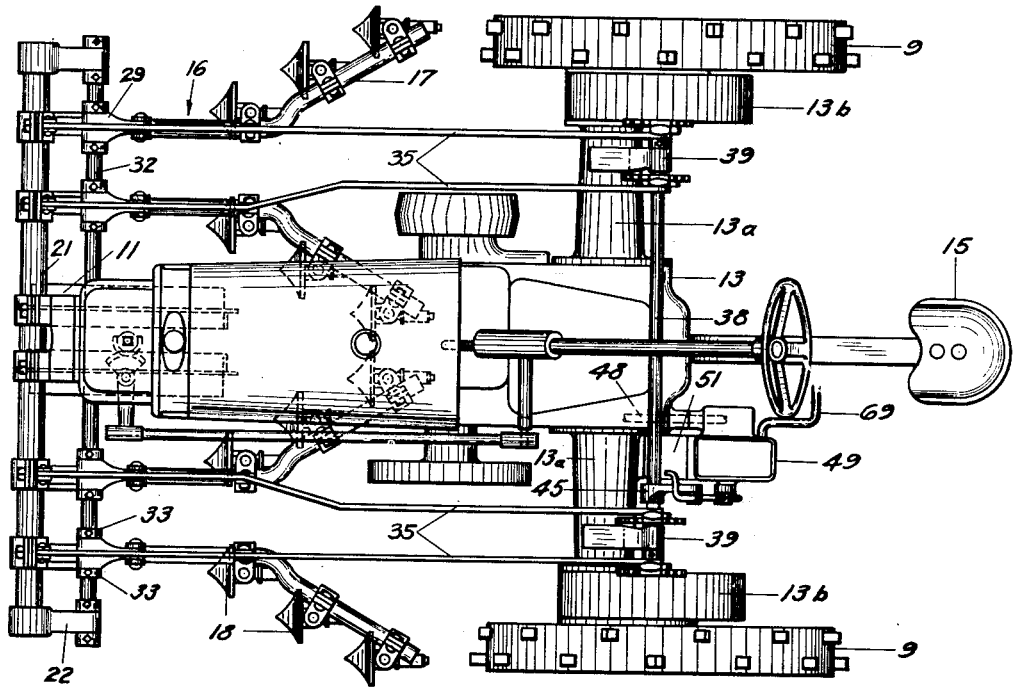
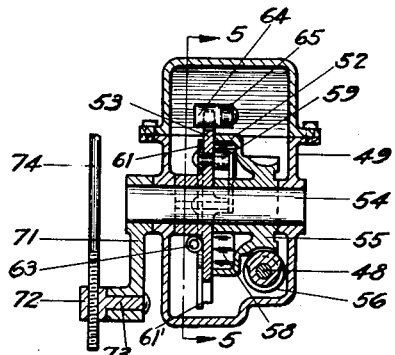
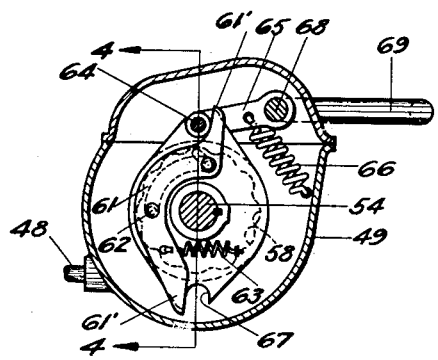
INVENTOR
Theophilus Brown
BY John L. Jackson
WITNESS
W. Ackerman
ATTORNEY Patented Aug. 16, 1932

1,872,237

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

TRACTOR CULTIVATOR

Application filed August 29, 1927. Serial No. 216,049.

The present invention relates to tractor cultivators, and pertains, more specifically, to a machine of this type in which the cultivator rigs are mounted at the front end of the tractor, and the depth adjusting levers for such rigs are mounted at the rear end of the tractor, in proximity to the driver's seat, although it may also be applied where the rigs or other operating tools are at the rear, or where the depth regulating levers are otherwise disposed than at the rear.

The fundamental object of the invention is to provide power lift mechanism for raising the cultivator rigs to their in-operative positions, in a machine of the above description. The invention contemplates mounting each of the aforesaid levers on a transverse rock shaft which, in the illustrated embodiment thereof, is mounted at the rear end of the tractor in proximity to the driver's seat, and connecting to such rock shaft a power driven lift clutch which is preferably located adjacent to the rear end of the tractor and which derives its operating power from the engine of the tractor.

Such construction and arrangement of power lift mechanism is shown in detail in the accompanying drawings illustrating the invention. In these drawings:

Figure 3 is a plan view of the machine.

Figure 4 is a transverse sectional view of the power lift clutch, corresponding to a section on the plane of the line 4—4 of Figure 5, and Figure 5 is a sectional view through the power lifting clutch, taken approximately on the plane of the line 5—5 of Figure 4.

Figure 1:
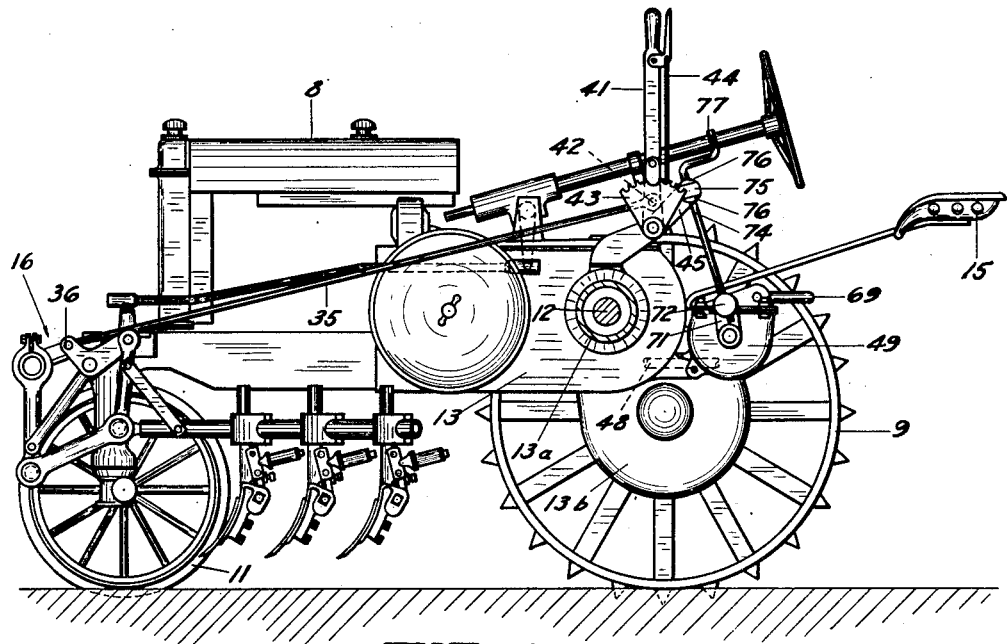
Figure 1 is a side view of the tractor cultivator, showing the cultivator rigs in their raised positions, and with the adjacent drive wheel of the tractor cut away to illustrate the position of the power lift parts.

The machine comprises a tractor 8 which is driven through rear drive wheels 9, and which is steered through one or more front dirigible wheels 11. The engine, which is shown as being mounted adjacent to the forward end of the tractor, transmits its power through any suitable clutch and selective speed transmission mechanism to laterally extending drive shafts 12, shown in section in Figs. 1 and 2. The aforesaid clutch and selective speed transmission mechanism is inclosed in a housing 13 which extend rearwardly from the tractor engine and constitutes a part of the tractor frame. The outwardly extending drive shafts 12 are inclosed in tubular housing extensions 13a, extending laterally from the main housing portion 13. The lateral housing portions 13—a constitute a part of the tractor frame, supporting the drive wheels 9 at their outer ends. The axles of the drive wheels are journaled in housing extensions 13b extending downwardly from the outer ends of the tubular housing portions 13a. Driving gears or chains may be provided in the downwardly extending housing portions 13b for operatively connecting the outer end of each shaft 12 with its respective drive wheel 9, but it is to be understood that the traction wheels may be driven by any other approved means. The operator's seat 15 is disposed in rear of the main housing 13.

The cultivator implement 16, in the particular machine shown, is supported on the front end of the tractor 8. Such cultivating implement comprises a plurality of independent cultivator rigs of any desired number, four of such rigs being shown. Each rig comprises a rearwardly extending beam 17 on which a plurality of cultivator shovels or other cultivator elements 18 are mounted. The rear ends of each pair of cultivator beams may diverge outwardly as shown, or may be otherwise arranged to dispose the cultivator shovels 18 in the desired relation for cultivating the ground between the planting rows. The invention in its broader aspect is not concerned with the details of these cultivator rigs, or with their location with respect to the tractor, being applicable to any particular form of cultivating implement characterized by a plurality of independenly adjustable rigs or other implement tools.

In the exemplary form of rig mounting shown, a heavy tubular cross bar 21 is fixedly supported at the front of the tractor on any suitable arrangement of arms or brackets 22 extending forwardly from the tractor frame. Clamped to this cross bar are four depending arms 23, each of these arms being disposed substantially in alignment with the front end of its associated cultivator beam 17. A link 24 is pivotally connected at 25 to the lower end of each arm, and the rear end of such link has pivotal connection at 26 to the front end of the associated cultivator beam 17. Extending upwardly from the pivot 26 is a substantially vertical link 27 which is pivoted at its upper end 28 to a bell crank lever 29. A diagonal brace link 31 is pivotally connected between the vertical link 27 and the cultivator beam 17. The four bell crank levers 29 are rotatably supported on another cross bar 32 which is rigidly supported at the front end of the tractor. Pairs of collars 33 (Fig. 3) are fixedly secured to the latter cross bar on opposite sides of each bell crank lever to hold the latter against shifting. A brace link 34 extends between the cross bar 32 and the lower portion of each arm 23. Each bell crank lever 29 is individually actuated in effecting the raising and lowering of its respective cultivator rig through an individual operating rod 35, which is pivotally connected to the bell crank lever at 36 and which extends rearwardly to an individual depth adjusting lever which will be presently described. It will be evident that limited fore and aft movement of the rod or link 35 will be operative to raise and lower the associated rig through its working range of depth adjustments (Fig. 2), and that continued forward movement of the rod 35 will be oprative to raise the cultivator rig clear of the ground, to the transport position shown in Fig. 1.

Referring now to the arrangement of the individual depth adjusting levers through which the depth adjustments of the rigs are obtained, and also to the power lift mechanism through which all of the rigs are lifted to transport position, it will be seen from Fig. 3 that the rock shaft 38 extends transversely across the rear end of the tractor at a point above the main housing 13. This rock shaft has bearing support in bearing brackets 39 which are rigidly secured to the laterally extending housing portions 13a, preferably adjacent to the outer ends thereof. The bearing brackets 39 incline rearwardly to dispose the rock shaft 38 in close proximity to the operator's seat 15. Rotatably mounted on said rock shaft are the four depth adjusting levers, previously referred to, which levers are designated 41. The four operating rods or links 35 are pivotally connected to their respective levers at 42. It will be understood that the actual number of levers 41 mounted on the rock shaft 38 will be dependent upon the number of cultivator rigs for which it is desired to have individual depth adjustments. Cooperating with each adjusting lever is a latch quadrant 43, the lever having any suitable form of latch mechanism 44 mounted thereon for effecting latching engagement with such quadrant 43. The latching quadrants of all of the levers are fixedly secured to the rock shaft 38 so as to swing therewith. Fixedly secured to the rock shaft and extending rearwardly therefrom is an operating arm 45 through which operating motion is transmitted to the rock shaft from the power lift mechanism.

The power lift mechanism is mounted on the tractor adjacent to the rear end thereof, and derives its operating energy from a power take-off shaft 48 which, in the embodiment of my invention here illustrated, has operative connection with the driving train of the tractor, although it may if desired be otherwise driven. Preferably this power take-off shaft enters the rear end of the main housing 13, adjacent to the bottom thereof, as indicated in dotted lines in Figs. 1 and 3, and extends forwardly therein for effecting operative connection in any suitable manner with some portion of the tractor driving train, such as with the belt pulley shaft or with the driving shaft on which the shiftable speed selecting gears are mounted. The housing 49 of the power take-off mechanism is suitably supported on a bracket 51 (Fig. 3) which projects rearwardly from the lateral housing portion 13a. This location of the housing 49 permits the power take-off shaft 48 to enter the side portion of said housing directly, and also facilitates the establishment of an operative connection between the power lift clutch and the rock shaft 38.

The power lift clutch comprises a driving clutch member 52 and a driven clutch member 53 concentric therewith, both mounted on a transverse shaft 54 which has bearing support in the side walls of the housing (see Figs. 4 and 5). The driving clutch member is mounted to rotate freely on shaft 54 and has a worm wheel 55 formed on one side thereof, with which meshes a worm 56 on the power take-off shaft 48. The arrangement is such that the power take-off shaft 48 rotates substantially constantly during the operation of the implement, and hence the driving clutch element 52 rotates constantly. The other clutch element 53 is keyed or pinned to the shaft 54. The clutch is of a construction commonly employed on many power lift plows and other agricultural implements, being of the type known as the "half revolution" clutch. That is to say the clutch mechanism has associated therewith certain tripping devices which operate normally to hold the clutch members out of operative connection with each other, but when tripped will cause them to become connected and to remain connected until the clutch has made a half revolution, when they are automatically disconnected by such tripping mechanism. On the next actuation of the tripping mechanism the clutch members are again connected and remain so until they complete the second half of the cycle, when they are again disconnected.

As such clutch is well known to those familiar with the art it is unnecessary to describe the construction in detail and it will suffice to say that the driving clutch member 52 is provided on its inner circumference with a series of notches 58 adapted to be engaged by a roller 59, said roller being mounted on one side of a trigger lever 61 which is pivotally supported at 62 on the outer side of the driven clutch member 53. A tension spring 63 is connected to the trigger lever 61 and normally tends to swing the driving roller 59 into the recesses 58. The trigger lever 61 is provided with outwardly extending trigger ends 61' which project beyond the periphery of the clutch member 53 and are adapted to be engaged by a roller 64 carried by a trip lever 65. A spring 66 normally tends to hold the roller 64 against the periphery of the clutch member 53 so that it is adapted to intercept one or the other of the trigger ends 61' to rock the trigger lever and thereby disconnect the clutch members. The periphery of the driven clutch member 53 is provided with diametrically opposite notches 67 in proximity to the trigger ends 61', the arrangement being such that after the roller 64 has actuated one of the trigger ends 61' to release the clutch, the roller will drop into the associated notch 67 and thereby lock the driven clutch member against rotation in either direction. The tripping lever 65 is mounted on a shaft 68 which extends transversely through the upper portion of the housing 49. One end of the shaft is bent rearwardly and laterally to form a tripping pedal 69 which is disposed in convenient proximity to the operator's seat 15. It will be understood from the foregoing description that whenever the pedal 69 is depressed the clutch members 52 and 53 will be connected and will rotate the shaft 54 through a half revolution, whereupon the clutch will be released and the shaft will stop; and that when the pedal 69 is again actuated the clutch will be re-engaged and the shaft 54 will rotate through the second half of its cycle and then stop.

One end of the shaft 54 projects laterally from the side of the housing 49 and has a crank arm 71 fixedly secured thereto. The swinging end of the crank carries a nut 72 having a reduced pivot pin 73 extending through the end of the crank arm and pivotally supporting the nut 72 on the side of the arm. Screwing down through the threaded portion of the nut is the threaded lower end of an adjustable link or pitman 74. The upper portion of such link passes through a collar 75 which has pivotal mounting on the side of the operating arm 45 in much the same manner as described of the pivotal mounting of nut 72 on the crank arm 71. Thrust collars 76 are secured to the link 74 and bear against opposite sides of the pivoted collar 75. The upper end of the link 74 is formed with a crank 77 which can be operated from the driver's seat 15 to screw the link upwardly or downwardly in the nut 72, and thereby increase or decrease the effective length of the link.

Figure 2:
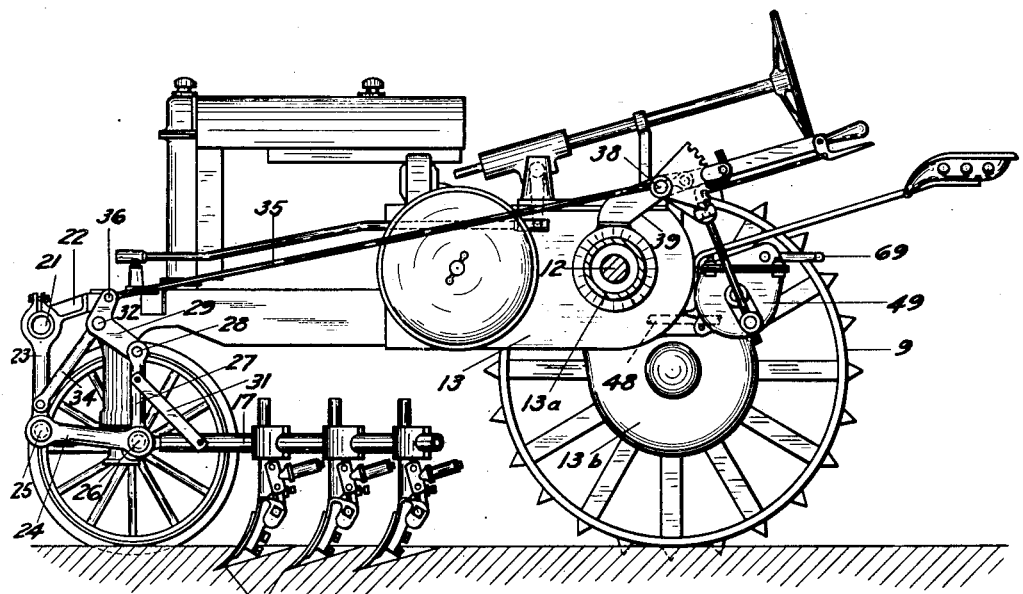
Figure 2 is a similar view showing the cultivator rigs in their lower, operative positions.

When the cultivator rigs are in their raised positions for transport, or for turning at the ends of the field, the power lift crank 71 is in its upper position, as shown in Fig. 1. The lift clutch is locked in this position by the engagement of the tripping collar 64 in one of the notches 67, and hence the clutch constitutes a stationary point of reaction, holding the cultivator rigs in their raised positions through the link 74, rock shaft 38, and levers 41. When it is desired to lower the cultivator rigs to their operative positions, the foot pedal 69 is depressed momentarily, which results in the power lift clutch rotating through a half revolution as before described and stopping with the crank arm 71 in the position shown in Fig. 2. This movement of the crank arm allows the rock shaft 38 and levers 41 to swing backwardly and hence allows the cultivator rigs to drop down into engagement with the ground. The crank arm is locked in this lower position through the self-locking action of the clutch as before described, and hence any adjustments of the cultivator rigs can be made with the crank arm serving as a stationary point of reaction. Thus by moving either of the levers 41 up or down along their latching sectors 43, the corresponding rigs can be raised or lowered for securing different depth adjustments, or for shaking out any stalks or other trash which may have become entangled in the cultivator shovels. The latching of the levers to their latching sectors holds the associated rigs at the desired depth adjustment. By this construction a very fine depth adjustment is obtainable and the power lift mechanism has its greatest leverage at the time of its greatest load; that is, the power lift operates through a greater amount of rotation to lift the rigs a given amount when they are in the ground, than when they have been raised out of the ground. When it is desired to raise or lower the entire group of rigs through a depth adjustment, such can be performed by rotating the crank handle 77 to screw the link 74 upwardly or downwardly in the nut 72, which has the action of rocking all of the levers 41 with a simultaneous movement, thereby raising or lowering all of the cultivator rigs.

Thus the link 74 afford a master adjustment for all of the levers 41 and their individual rigs. When it is desired to raise all of the rigs to their elevated or transport positions it is only necessary to repeat the tripping of the foot pedal 69, which again engages the lift clutch and revolves the crank arm 71 to the upper position shown in Fig. 1. It should be noted that when the rigs are in their elevated positions, the crank handle 77 can be actuated to raise or lower the rigs and thereby increase or decrease their clearance above the ground.

Having thus described my invention what I claim as new and desire to obtain by Letters Patent of the United States, is:

1. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a plurality of separately operable levers, means connecting said levers respectively with said rigs and operable by the actuation of said levers to lift such rigs separately, connecting means for connecting said levers together to operate in unison and including a rock shaft and latching sectors rigidly secured thereto, and a connection between said rock shaft and said clutch mechanism for actuating the lifting devices by the operation of said clutch mechanism.

2. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a plurality of separately operable levers, means connecting said levers respectively with said rigs and operable by the actuation of said levers to lift such rigs separately, connecting means for connecting said levers together to operate in unison, and means for actuating the lifting devices by the operation of said clutch mechanism, including an adjustable connection between said connecting means and said clutch mechanism, whereby the height to which the rigs are raised and lowered by the operation of said clutch mechanism may be regulated.

3. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a rock-shaft mounted on the tractor, a plurality of levers loosely mounted on said rock-shaft and operable independently of said rock shaft and of each other, lifting connections between said levers and said rigs respectively whereby the rigs may be lifted by the actuation of said levers, means for connecting said levers with said rock-shaft to rock therewith, and an operating connection between said rock-shaft and said clutch mechanism for rocking said rock-shaft.

4. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a rock-shaft mounted on the tractor, a plurality of levers loosely mounted on said rock-shaft, connections between said levers and said rigs respectively for lifting the rigs by the actuation of said levers, means for connecting said levers with said rock-shaft to rock therewith, and an operating connection between said rock-shaft and said clutch mechanism for rocking said rock-shaft, said operating connection being adjustable to regulate the height to which the rigs are raised and lowered by the operation of said clutch mechanism.

5. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a rock-shaft mounted on the tractor, an operating connection between said rock-shaft and said clutch mechanism for rocking said rock-shaft by the operation of said clutch mechanism, notched sectors mounted on said rock-shaft to rock therewith, levers loosely mounted on said rock-shaft and having latches adapted to engage said sectors respectively, and lifting connections connecting said levers with said rigs respectively for separately raising and lowering said rigs by the separate operation of said levers.

6. In an agricultural implement, the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a rock-shaft mounted on the tractor, an adjustable operating connection between said rock-shaft and said clutch mechanism for rocking said rock-shaft by the operation of said clutch mechanism, notched sectors mounted on said rock-shaft to rock therewith, levers loosely mounted on said rock-shaft and having latches adapted to engage said sectors respectively, bell-crank levers mounted on the tractor, means connecting one of the arms of one of said levers with one of said rigs, and rods connecting the other arms of said bell-crank levers with the several levers mounted on said rock-shaft whereby the several rigs may be separately raised or lowered by the operation of the latter levers.

7. In an agricultural implement, the combination with a tractor including power take-off means, of a plurality of cultivator rigs mounted at the front of the tractor to swing vertically, a transversely extending rock-shaft mounted on the rear portion of the tractor, levers loosely mounted on said shaft, latch mechanism for connecting said levers with said rock-shaft to rock therewith, means connecting said levers with said rigs respectively and operable by said levers to swing said rigs vertically, a half revolution clutch mounted on the rear portion of the tractor and adapted to be actuated by said power take-off means, and manually adjustable means operatively connecting said clutch with said rock-shaft.

8. In an agricultural implement, the combination with a tractor including power take-off means, of a plurality of cultivator rigs connected with the tractor to swing vertically, lifting devices for said rigs comprising a plurality of separately operable levers, means connecting said levers respectively with said rigs and operable by the actuation of said levers to lift such rigs separately, connecting means for connecting said levers together to operate in unison, a worm driven by said power take-off means, a worm wheel driven by said worm, a half revolution clutch deriving power from said worm wheel, and a connection between said clutch and said connecting means for actuating the lifting devices by the operation of said clutch.

9. In an agricultural implement, the combination with a tractor including power take-off means, of a plurality of cultivator rigs connected with the tractor to swing vertically, half revolution clutch mechanism mounted on the tractor and adapted to be actuated by said power take-off, and lifting devices for said rigs comprising a plurality of separately operable levers, means connecting said levers respectively with said rigs and operable by the actuation of said levers to lift such rigs separately, connecting means for connecting said levers together to operate in unison, and a connection between said connecting means and said clutch mechanism for actuating the lifting devices by the operation of said clutch mechanism, said connection being adjustable to regulate the height to which said lifting devices are raised by said clutch mechanism.

10. The combination with a tractor including a motor, traction wheels driven by said motor, a power take-off shaft on the tractor, and driving connections between the motor and said shaft, of lifting mechanism for an implement associated with the tractor to be propelled thereby, comprising half revolution clutch mechanism including a normally rotating member, a normally stationary member, and means for optionally connecting said members to rotate in unison, a power transmitting connection between said power take-off shaft and said normally rotating clutch member, lifting means, said lifting means including a rock shaft, a power transmitting connection between said normally stationary clutch member and said rock shaft, for rocking said shaft by the rotation of the latter clutch member, and a lever operable either in conjunction with, or separately from, the rocking of said rock shaft, to vary the vertical position of the implement.

11. The combination with a tractor including a motor, traction wheels driven by said motor, a power take-off shaft on the tractor, and driving connections between the motor and said shaft, of lifting mechanism for an implement associated with the tractor to be propelled thereby, comprising a housing mounted on the tractor, half revolution clutch mechanism within said housing, including concentric driving and driven members, and a worm having a driving connection with said driving clutch member and with said power take-off shaft, a crank at one side of said housing connected to rotate with said driven clutch member, a rock shaft mounted on the tractor and having a fixed arm, means connecting said crank with said arm for rocking said rock shaft by said clutch mechanism, and means actuated by the rocking of said rock shaft to lift the implement.

12. The combination with a tractor including a motor, traction wheels driven by said motor, a power take-off shaft on the tractor, and driving connections between the motor and said shaft, of lifting mechanism for an implement associated with the tractor to be propelled thereby, comprising a housing mounted on the tractor, half revolution clutch mechanism within said housing and having a driving connection with said power take-off shaft, a crank at one side of said housing optionally driven by said clutch mechanism, a rock shaft mounted on the tractor and having a fixed arm, means connecting said crank with said arm for rocking said rock shaft by said clutch mechanism, and means operable either in conjunction with, or separately from, the rocking of said rock shaft, to lift the implement.

13. The combination with a tractor including a motor, transmission mechanism driven thereby, a housing for said transmission mechanism, and a power take-off shaft having driving connection with said transmission mechanism and extending out of said housing, of a clutch housing supported by said first-mentioned housing, a clutch shaft journaled in said clutch housing and extending outside thereof at one end, a crank fixed upon the outer end portion of said clutch shaft to rotate therewith, a half revolution clutch in said clutch housing comprising a member fast on said clutch shaft and a member loose on said clutch shaft, a driving connection between said power take-off shaft and said loose clutch member, a rock shaft, lifting devices operable by the rocking of said rock shaft, and an operating connection between said crank and said rock shaft for rocking the rock shaft by rotation of said clutch shaft.

14. The combination with a tractor including a motor, transmission mechanism driven thereby, a housing for said transmission mechanism, and a power take-up shaft having driving connection with said transmission mechanism and extending out of said housing, of a clutch housing supported by said first-mentioned housing, a clutch shaft journaled in said clutch housing and extending outside thereof at one end, a crank fixed upon the outer end portion of said clutch shaft to rotate therewith, a half revolution clutch in said clutch housing comprising a member fast on said clutch shaft and a member loose on said clutch shaft, a driving connection between said power take-off shaft and said loose clutch member, a rock shaft, an arm fixed on said rock shaft to rock therewith, a connection between said crank and said arm for rocking said rock shaft by rotation of said clutch shaft, and lifting devices operable by the rocking of said rock shaft.

15. The combination with a tractor including a motor, transmission mechanism driven thereby, a housing for said transmission mechanism, and a power take-off shaft having driving connection with said transmission mechanism and extending out of said housing, of a clutch housing supported by said first-mentioned housing, a clutch shaft journaled in said clutch housing and extending outside thereof at one end, a crank fixed upon the outer end portion of said clutch shaft to rotate therewith, a half revolution clutch in said clutch housing comprising a member fast on said clutch shaft and a member loose on said clutch shaft, a driving connection between said power take-off shaft and said loose clutch member, a rock shaft, an arm fixed on said rock shaft to rock therewith, a connection between said crank and said arm for rocking said rock shaft by rotation of said clutch shaft, a lifting lever mounted on said rock shaft to swing independently thereof, manually operable means for locking said lever to said rock shaft to rock therewith, and lifting devices connected with said lever for actuation by movement thereof.

16. The combination with a tractor including a motor, transmission mechanism driven thereby, a housing for said transmission mechanism, and a power take-off shaft having driving connection with said transmission mechanism and extending out of said housing, of a clutch housing supported by said first-mentioned housing, a clutch shaft journaled in said clutch housing and extending outside thereof at one end, a crank fixed upon the outer end portion of said clutch shaft to rotate therewith, a half revolution clutch in said clutch housing comprising a member fast on said clutch shaft and a member loose on said clutch shaft, a driving connection between said power take-off shaft and said loose clutch member, a rock shaft, an arm fixed on said rock shaft to rock therewith, a manually adjustable connection between said crank and said arm for rocking said rock shaft by rotation of said clutch shaft, and lifting devices operable by the rocking of said rock shaft.

17. The combination with a tractor including a motor, transmission mechanism driven thereby, a housing for said transmission mechanism, and a power take-off shaft having driving connection with said transmission mechanism, of a clutch housing supported by said first-mentioned housing, a clutch shaft journaled in said clutch housing and extending outside thereof at one end, a crank fixed upon the outer end portion of said clutch shaft to rotate therewith, a half revolution clutch in said clutch housing comprising a member fast on said clutch shaft and a member loose on said clutch shaft, a worm and worm wheel connection in said clutch housing between said power take-off shaft and said loose clutch member, a rock shaft, lifting devices operable by the rocking of said rock shaft, and an operating connection between said crank and said rock shaft for rocking the rock shaft by rotation of said clutch shaft.

18. The combination with a tractor including a motor, a power take-off shaft extending longitudinally of the tractor, and driving connections between the motor and said shaft, of lifting mechanism for an implement associated with the tractor to be propelled thereby comprising half revolution clutch mechanism mounted on the tractor, including a normally rotating member, a normally stationary member, and means for optionally connecting said members to rotate in unison, a worm and worm wheel for driving said normally rotating clutch member from said power take-off shaft, a transverse shaft connected to rotate with said normally stationary clutch member, a crank on said transverse shaft and driven thereby for swinging movement in a substantially vertical plane, a rock shaft, an operating connection between said crank and said rock shaft for rocking the same by the rotation of said transverse shaft, and lifting devices adapted to be actuated by the rocking of said rock shaft to lift the implement, said lifting devices including a lever operable either in conjunction with, or separately from, the rocking of said rock shaft, to vary the vertical position of the implement.

19. In an agricultural implement the combination with a tractor including power take-off means, of a plurality of cultivator rigs connected with the tractor to swing vertically, half revolution clutch mechanism mounted on the tractor and adapted to be actuated by said power take-off means, and lifting devices for said rigs comprising a plurality of separately operable levers, lifting rods connecting said levers with said rigs, said rods being in substantial alinement with said levers in one position of the rigs, a rock shaft and latching means for actuating said levers in unison, and a connection between said rock shaft and said clutch mechanism for actuating said rock shaft by the operation of said clutch mechanism.

20. In an agricultural implement, the combination with a tractor including a motor, of a plurality of implement tools mounted at the front of the tractor for vertical movement, a transversely extending rock shaft mounted on the rear portion of the tractor, levers loosely mounted on said rock shaft, latch mechanism for connecting said levers with said rock shaft to rock therewith, means connecting said levers with said tools respectively and operable by said levers to move said tools vertically, power lift mechanism mounted on the rear portion of the tractor and adapted to be actuated by said motor, and an operating connection between said power lift mechanism and said rock shaft for rocking the same.

21. In an agricultural implement, the combination with a tractor including a motor, of a plurality of implement tools mounted at the front of the tractor for vertical movement, a transversely extending rock shaft mounted on the rear portion of the tractor, levers loosely mounted on said rock shaft, latch mechanism for connecting said levers with said rock shaft to rock therewith, means connecting said levers with said tools respectively and operable by said levers to move said tools vertically, power lift mechanism mounted on the rear portion of the tractor and adapted to be actuated by said motor, and an operating connection between said power lift mechanism and said rock shaft for rocking the same, said connection being manually adjustable for depth adjustment purposes.

22. In an agricultural implement, the combination with a tractor including a motor, of a plurality of implement tools mounted at opposite sides of the front portion of the tractor to move vertically, a transversely extending rock shaft mounted on the rear portion of the tractor, levers loosely mounted on said rock shaft, latch mechanism for connecting said levers with said rock shaft to rock therewith, longitudinally disposed fore and aft movable members connecting said levers with said tools respectively and operable by said levers to move the tools vertically, power lift mechanism mounted on the rear portion of the tractor and adapted to be driven by said motor, and an operating connection between said power lift mechanism and said rock shaft.

23. The combination with a tractor including a motor, of an implement comprising a transversely disposed member extending at opposite sides of the tractor near the front thereof ground working tools positioned on opposite sides of the tractor and connected with said transverse member to move vertically with respect thereto, lifting mechanism mounted at the rear of the tractor and operated by said motor, and connections from said lifting mechanism to said tools including longitudinally disposed fore and aft movable members positioned on opposite sides of the tractor.

24. The combination with a tractor including a motor, of an implement comprising a transversely disposed member extending at opposite sides of the tractor near the front thereof, ground working tools positioned at opposite sides of the tractor and connected with said member to move vertically with respect thereto, power lift mechanism mounted at the rear of the tractor and operated by said motor, and connections from said power lift mechanism to said tools including means operable either by said power lift mechanism or manually independently thereof to move the tools vertically.

25. The combination with a tractor including a motor, of an implement comprising a transversely disposed member extending at opposite sides of the tractor near the front thereof, ground working tools positioned at opposite sides of the tractor and connected with said member to move vertically with respect thereto, power lift mechanism mounted at the rear of the tractor and operated by said motor, and connections from said power lift mechanism to said tools comprising means operable either by said power lift mechansm or manually independently thereof to move the tools vertically, the latter means including a transversely positioned rock shaft at the rear of the tractor, an operating connection between the power lift mechanism and said rock shaft, levers loosely mounted on said rock shaft for independent operation, means for connecting said levers non-rotatably to said rock shaft, and longitudinally disposed fore and aft movable members positioned on opposite sides of the tractor and connecting said levers respectively with the tools to be moved by the actuation thereof.

26. The combination with a tractor having rear traction and front steering wheels, a differential housing at the rear portion thereof having laterally extending members, and a motor, of an implement comprising a transversely disposed member extending at opposite sides of the tractor near the front thereof, ground working tools positioned at opposite sides of the tractor and connected with said transverse member to move vertically with respect thereto, power lift mechanism mounted at the rear of the tractor and operated by said motor, brackets mounted on the opposite side portions of the differential housing, a transverse rock shaft journaled in said brackets, an operating connection between said power lift mechanism and said rock shaft for actuating the same, lifting levers mounted on said rock shaft and operable either in unison therewith or independently thereof, and lifting connections between said levers and the respective tools.

27. In an agricultural implement, the combination with a tractor including a motor, of a plurality of implement tools connected with the tractor to move vertically, lifting devices for said tools comprising a plurality of separately operable levers, means connecting said levers respectively with said tools and operable by the actuation of said levers to lift said tools separately, connecting means for optionally connecting said levers together to operate in unison, power lift mechanism adapted to be actuated by said motor, and a connection between said power lift mechanism and said connecting means for actuating the lifting devices by said power lift mechanism.

28. In an agricultural implement, the combination with a tractor including a motor, of a plurality of implement tools connected with the tractor to move vertically, lifting devices for said tools comprising a plurality of separately operable levers, means connecting said levers respectively with said tools and operable by the actuation of said levers to lift said tools separately, connecting means for optionally connecting said levers together to operate in unison, power lift mechanism adapted to be actuated by said motor, and a connection between said lower lift mechanism and said connecting means for actuating the lifting devices by said power lift mechanism, said connection being manually adjustable to adjust the operating depth of the tools.

29. The combination with a tractor including a motor, and traction wheels driven by said motor, of lifting mechanism for implement tools associated with the tractor to be propelled thereby, comprising power lift mechanism driven from said motor and including a normally stationary optionally driven member, lifting levers connected with the implement tools, respectively, and a power transmitting connection operatively connected with said normally stationary member and with said lifting levers for actuating the same in unison, said levers being operable independently of said normally stationary member and of each other to move the implement tools vertically.

30. The combination with a tractor including a motor, of lifting mechanism for an implement associated with the tractor to be propelled thereby, comprising power lift mechanism driven by said motor, a rock shaft, an optionally actuated power transmitting connection between said power lift mechanism and said rock shaft, and a lever operable either in conjunction with or separately from the rocking of said rock shaft to vary the vertical position of the implement.

31. The combination with a tractor including a motor, of lifting mechanism for implement tools associated with the tractor to be propelled thereby, comprising power lift mechanism, a transversely disposed rock shaft, an optionally operated power transmitting connection between said power lift mechanism and said rock shaft for actuating the same, levers carried by said rock shaft and operable either in conjunction therewith or separately therefrom, and lifting connections between said levers and the implement tools, respectively.

32. The combination with a tractor including a motor, of a plurality of implement tools associated with the tractor to be propelled thereby, and lifting mechanism for said tools comprising a normally stationary member optionally driven from said motor, a rock shaft, a power transmitting connection operatively connecting said normally stationary member with said rock shaft, lifting levers connected respectively with said tools, and means for connecting said levers to rock in unison with said rock shaft or for disconnecting them therefrom for independent manual operation.

33. In an agricultural implement the combination with a tractor including a motor, of a plurality of implement tools connected with the tractor to move vertically, power lift mechanism mounted on the tractor and adapted to be actuated by said motor, and lifting devices for said tools comprising a plurality of separately operable levers, lifting rods connecting said levers respectively with said tools, said rods being in substantial alinement with said levers in one position of the tools, a rock shaft and latching means for actuating said levers in unison, and a connection between said rock shaft and said power lift mechanism for optionally actuating said rock shaft by the operation of said power lift mechanism.

34. In an agricultural implement the combination with a tractor including a motor, of a plurality of implement tools connected with the tractor to move vertically, power lift mechanism mounted on the tractor and adapted to be actuated by said motor, and lifting devices for said tools comprising a plurality of separately operable levers, lifting rods connecting said levers respectively with said tools, said rods being in substantial alinement with said levers in one position of the tools, a rock shaft and latching means for actuating said levers in unison, and a connection between said rock shaft and said power lift mechanism for optionally actuating said rock shaft by the operation of said power lift mechanism, said connection being adjustable to vary the operating depth of the tools.

35. In an agricultural implement, the combination with a tractor including power take-off means, of a plurality of implement tools connected with the tractor to move vertically, half revolution clutch mechanism mounted on the tractor and adapted to be actuated by said power take-off means, and lifting devices for said tools comprising a plurality of separately operable levers, lifting rods connecting said levers with said tools, a rock shaft and latching means for actuating said levers in unison, and a connection between said rock shaft and said clutch mechanism for actuating said rock shaft by the operation of said clutch mechanism, said connection being adjustable to vary the operating position of the tools.

36. The combination with a tractor including a motor, of a plurality of implement tools connected with the tractor for vertical movement, certain of said tools being adapted to move vertically independently of other of said tools, power lift mechanism adapted to be operated by power from said motor, a plurality of lifting devices separately connected with said tools respectively and operable to move vertically the tools connected therewith, a common operating connection between said lifting devices and said power lift mechanism for actuating said lifting devices in unison by power from said motor, and means for manually disconnecting said lifting devices separately from said common operating connection for individual manual operation thereof independently of actuation of said operating connection.

37. The combination with a tractor including a motor, of a plurality of implement tools connected with the tractor for vertical movement, certain of said tools being adapted to move vertically independently of other of said tools, power lift mechanism adapted to be operated from said motor, a rock shaft, an operating connection between said power lift mechanism and said rock shaft adapted to be optionally operated to rock said shaft, lifting members separately operable to lift the respective tools independently of each other and of the rocking of said rock shaft, and means for separately connecting said lifting members respectively with, or disconnecting them from said rock shaft, whereby said lifting members may be actuated in unison by the rocking of said shaft, or may be actuated independently of said rock shaft and of each other.

38. The combination with a tractor including a motor, of a transversely extending draft member connected with the tractor, a plurality of implement tools connected with said draft member to move up and down, certain of said tools being adapted to move vertically independently of other of said tools, power lift mechanism adapted to be operated by said motor, lifting levers mounted on the tractor and connected with said independently movable tools for separately moving the same up or down, and an operating connection common to said lifting levers and operatively connecting the same with said power lift mechanism for optional operation thereby to lift the tools connected therewith in unison, said lifting levers being separately operable independently of said common operating connection.

39. The combination with a tractor including a motor, of a plurality of implement tools connected with the tractor for vertical movement, certain of said tools being adapted to move vertically independently of other of said tools, power lift mechanism adapted to be operated by power from said motor, a plurality of lifting devices separately connected with said tools respectively and operable to move vertically the tools connected therewith, and a common operating connection between said lifting devices and said power lift mechanism for actuating said lifting devices in unison by power from said motor, said lifting devices being separately operable manually independently of actuation of said operating connection.

THEOPHILUS BROWN.